(12) United States Patent
Gan

(10) Patent No.: US 12,084,156 B2
(45) Date of Patent: Sep. 10, 2024

(54) UNDERWATER HULL CLEANING MACHINE, HULL CLEANING SYSTEM AND METHOD FOR CLEANING A HULL OF A VESSEL

(71) Applicant: Chong Bin Michael Gan, Singapore (SG)

(72) Inventor: Chong Bin Michael Gan, Singapore (SG)

( * ) Notice: Subject to any disclaimer, the term of this patent is extended or adjusted under 35 U.S.C. 154(b) by 882 days.

(21) Appl. No.: 17/044,782

(22) PCT Filed: Apr. 16, 2019

(86) PCT No.: PCT/SG2019/050214
§ 371 (c)(1),
(2) Date: Oct. 1, 2020

(87) PCT Pub. No.: WO2019/203729
PCT Pub. Date: Oct. 24, 2019

(65) Prior Publication Data
US 2021/0107607 A1    Apr. 15, 2021

(30) Foreign Application Priority Data

Apr. 18, 2018 (SG) ............ 10201803261S

(51) Int. Cl.
*B63B 59/08* (2006.01)
*A46B 13/00* (2006.01)
(Continued)

(52) U.S. Cl.
CPC ............ *B63B 59/08* (2013.01); *A46B 13/008* (2013.01); *A46B 13/02* (2013.01); *B08B 1/32* (2024.01); *B08B 13/00* (2013.01); *B63B 39/08* (2013.01)

(58) Field of Classification Search
CPC ... B63B 59/08; B63B 39/08; B63B 2059/087; B63B 59/10; A46B 13/008; A46B 13/02; B08B 1/04; B08B 13/00; Y02T 70/00
See application file for complete search history.

(56) References Cited

U.S. PATENT DOCUMENTS 4,604,960 A   8/1986  Wachi
4,697,536 A   10/1987 Hirata
(Continued)

FOREIGN PATENT DOCUMENTS

CN    204868881 U    12/2015
CN    105593115 A    5/2016
(Continued)

OTHER PUBLICATIONS

Machine translation of KR 20150062421 (Year: 2015).*
(Continued)

*Primary Examiner* — Erin F Bergner
(74) *Attorney, Agent, or Firm* — Maschoff Brennan

(57) ABSTRACT

According to embodiments of the present invention, an underwater hull cleaning machine is provided. The cleaning machine includes a housing including a base region adapted to be arranged facing at least part of an external surface to be cleaned; a guiding mechanism coupled to the housing, wherein the guiding mechanism is configured to enable the cleaning machine to be maneuvered along the external surface; and at least one brush configured to move between an extended position and a retracted position. In the extended position, the at least one brush is extended downwardly towards the base region to be in contact with the external surface. In the retracted position, the at least one brush is moved upwardly away from the base region to be free from contact with the external surface. According to (Continued)

further embodiments, a hull cleaning system and a method for cleaning a vessel hull are also provided.

18 Claims, 10 Drawing Sheets

(51) Int. Cl.
  *A46B 13/02* (2006.01)
  *B08B 1/32* (2024.01)
  *B08B 13/00* (2006.01)
  *B63B 39/08* (2006.01)

(56) References Cited

U.S. PATENT DOCUMENTS

| | | | |
|---|---|---|---|
| 5,852,984 | A | 12/1998 | Matsuyama et al. |
| 5,947,051 | A | 9/1999 | Geiger |
| 6,877,452 | B1 * | 4/2005 | Hudd ............... B63B 59/08 |
| | | | 114/222 |
| 9,550,552 | B2 | 1/2017 | Dyhrberg |
| 2014/0116316 | A1 | 5/2014 | Fontaine |

FOREIGN PATENT DOCUMENTS

| | | |
|---|---|---|
| CN | 206202630 U | 5/2017 |
| CN | 206885294 U | 1/2018 |
| GB | 2156665 A | 10/1985 |
| JP | 2011088485 A | 5/2011 |
| JP | 2012213746 A | 11/2012 |
| JP | 2015157587 A | 9/2015 |
| KR | 100811540 B1 | 3/2008 |
| KR | 20130143228 A | 12/2013 |
| KR | 20150062421 A | 6/2015 |
| WO | 2010134022 A1 | 11/2010 |
| WO | 2016036254 A1 | 3/2016 |

OTHER PUBLICATIONS

International Search Report and Written Opinion PCT/SG2019/050214, mailed Jul. 10, 2019.
The Office Action issued by the Taiwanese Intellectual Property Office dated Feb. 4, 2020 for the Taiwanese Patent Application No. 108113355.
European Search Report for International Application No. PCT/SG2019/050214 mailed Dec. 16, 2021.
Japanese Office Action for Japanese Patent Application No. 2020-558028 mailed Jan. 5, 2022.
Thornton et al. "Zero-G class underwater robots: Unrestricted attitude control using control moment gyros." Institute of Industrial Science, The University of Tokyo, 2006, vol. 58-2, p. 175-178.
Australian Examination Report for Australian Application No. 2019255173 mailed Feb. 3, 2022.
Chinese Office Action, as issued in connection with Chinese Application No. 201980025906.X, dated Mar. 3, 2022, 21 pgs.
Chinese Office Action, as issued in connection with Chinese Application No. 201980025906.X, dated Aug. 31, 2022, 23 pgs.
Chinese Office Action, as issued in connection with Chinese Application No. 201980025906.X, dated Feb. 18, 2023, 26 pgs.
Chinese Rejection Decision, as issued in connection with Chinese Application No. 201980025906.X, dated May 8, 2023, 18 pgs.
European Search Report, as issued in connection with European Application No. 19788367.1, dated Oct. 18, 2023, 13 pgs.

* cited by examiner

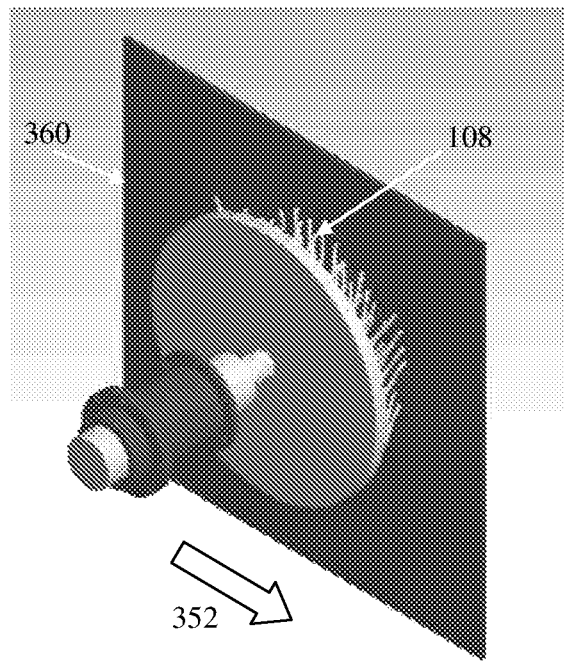
FIG. 3E
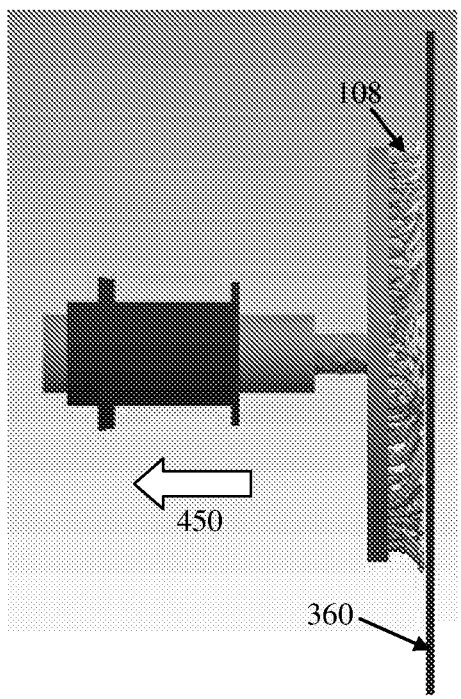
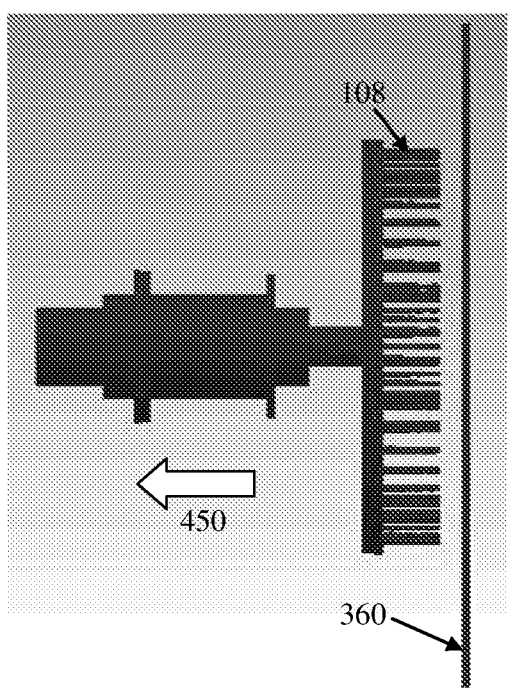
FIG. 4A                FIG. 4B

UNDERWATER HULL CLEANING MACHINE, HULL CLEANING SYSTEM AND METHOD FOR CLEANING A HULL OF A VESSEL

CROSS-REFERENCE TO RELATED APPLICATION

This application claims the benefit of priority of Singapore patent application No. 10201803261S, filed 18 Apr. 2018, the content of it being hereby incorporated by reference in its entirety for all purposes.

TECHNICAL FIELD

Various embodiments relate to an underwater hull cleaning machine, a hull cleaning system, and a method of cleaning a hull of a vessel.

BACKGROUND

The cost of fuel contributes significantly to the overall operational cost of a ship. Burning more fuel also contributes to the "green house effect". To keep operational cost down and to reduce the "green house effect", the fuel consumption of the ship needs to be managed and reduced efficiently. Fuel is used to generate the propulsive energy of the ship. To obtain a high level of propulsive energy efficiency, hydrodynamic resistance (or friction), for example, from the ship's hull needs to be minimized.

In order to minimize or even eliminate such hydrodynamic resistance, the ship's hull needs to be kept smooth by periodic cleaning, for example, by underwater hull cleaning.

Underwater hull cleaning further provides several benefits such as unclogging fouled suction grates to improve the flow of water to the internal machinery of the ship. It is a common practice in the shipping or maritime industry to clean the hull regularly to prevent biofouling buildup, which may effectively maintain the coatings of the hull surface, and even lengthen the lifespan thereof.

Most common technologies for removing biofouling rely on brushes or water jets.

Although water jet-based underwater cleaning machines are becoming more widely used with the development of this technology, the brush-based underwater cleaning machines are still known to provide a higher level of productivity.

Conventional brush-based underwater hull cleaning machines have constant or continuous surface contact by brushes on a surface to be cleaned, regardless of whether the surface is fouled or not fouled by marine growth. In other words, these existing underwater hull cleaning machines are get/go types. In other words, these cleaning machines perform cleaning constantly as long as the machines are in use. Consequently, the brush or brushes unnecessarily agitate, remove, and/or damage a layer of expensive anti-fouling or existing coating, which is undesirable.

Further, some conventional brush-based underwater hull cleaning machines require a diver's manual operation and/or lack functions to provide environmental-friendly hull cleaning.

Thus, there is a need for a hull cleaning system and underwater hull cleaning machine where the brush contact with a surface of (for example, a hull surface) may be controlled to address at least the problems mentioned herein.

SUMMARY

According to an embodiment, an underwater hull cleaning machine is provided. The underwater hull cleaning machine may include a housing including a base region adapted to be arranged facing at least part of an external surface to be cleaned; a guiding mechanism coupled to the housing, wherein the guiding mechanism is configured to enable the underwater hull cleaning machine to be maneuvered along the external surface; and at least one brush configured to move between an extended position and a retracted position, wherein in the extended position, the at least one brush is extended downwardly towards the base region to be in contact with the at least part of the external surface, and wherein in the retracted position, the at least one brush is moved upwardly away from the base region to be free from contact with the external surface.

According to an embodiment, a hull cleaning system is provided. The hull cleaning system may include an underwater hull cleaning machine in accordance with various embodiments; and a tank arranged to receive marine growth and/or contaminants removed by the underwater hull cleaning machine.

According to an embodiment, a method for cleaning a hull of a vessel is provided. The method may include deploying an underwater hull cleaning machine in accordance with various embodiments to a surface of the hull; capturing a real-time image of a part of the surface for determining whether the part of the surface is to be cleaned; lowering at least one brush of the underwater hull cleaning machine to an extended position if it is determined for the part of the surface to be cleaned, wherein in the extended position, the at least one brush extends downwardly towards a base region of the underwater hull cleaning machine and contacts with the part of the surface; and raising the at least one brush to a retracted position if it is determined for the part of the surface not to be cleaned, wherein in the retracted position, the at least one brush moves upwardly away from the base region and is free from contact with the surface.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 3E shows a perspective view of FIG. 3D, in accordance with one embodiment.

FIGS. 4A and 4B show snapshots of an animated simulation seen from the side view at different instances, illustrating the movement of the at least one brush relative to the external surface in a reverse direction, in accordance with one embodiment.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments relate to underwater hull cleaning in relation to the shipping industry. More specifically, a system and apparatus for remote-control underwater cleaning of a hull of a vessel; and a method of underwater cleaning a hull of a vessel are described.

Various embodiments may provide a remote control reclaim with surface torque control hull cleaning machine.

In various embodiments, an underwater hull cleaning machine is provided. The underwater hull cleaning machine may be used for cleaning a ship's hull, a barge, an oil rig platform, and/or a semi-submersible hull.

Figure 1A:
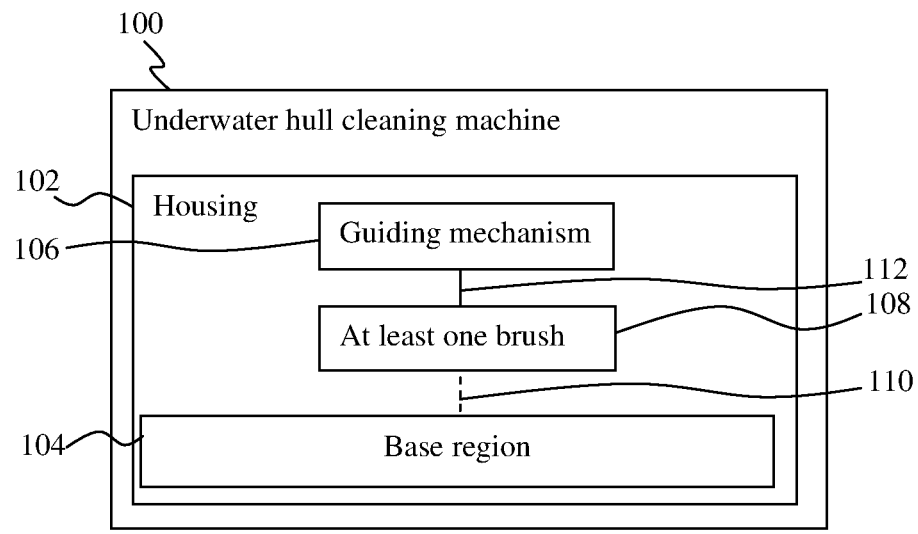
FIG. 1A a schematic representation of an underwater hull cleaning machine, in accordance with various embodiments.

FIG. 1A shows a schematic representation of an underwater hull cleaning machine 100, in accordance with various embodiments.

In FIG. 1A, the underwater hull cleaning machine 100 includes a housing 102 including a base region 104 adapted to be arranged facing at least part of an external surface to be cleaned; a guiding mechanism 106 coupled to the housing 102, wherein the guiding mechanism 106 is configured to enable the underwater hull cleaning machine 100 to be maneuvered along the external surface; and at least one brush 108 configured to move between an extended position and a retracted position, wherein in the extended position, the at least one brush 108 is extended downwardly towards the base region 104 to be in contact with the at least part of the external surface, and wherein in the retracted position, the at least one brush 108 is moved upwardly away from the base region 104 to be free from contact with the external surface.

The at least one brush 108 may be extendable to different positions relative to the base region 104 as denoted by a dotted line 110. The guiding mechanism 106 works along with the at least one brush 108 as denoted by a solid line 112 to enable cleaning with surface torque control.

In context of various embodiments, the phrase "the at least one brush is extended downwardly towards the base region" means that "the at least one brush is extended downwardly in a direction toward the base region" and the phrase "the at least one brush is moved upwardly away from the base region" means that "the at least one brush is moved upwardly in a direction away from the base region".

In other words, the underwater hull cleaning machine 100 includes the housing 102 that houses or holds the at least one brush 108 and the guiding mechanism 106. For example, the guiding mechanism 106 may be coupled to the housing 102; and may be configured to move the underwater hull cleaning machine 100 along an external surface to be cleaned. The guiding mechanism 106 may be operably by an operator or a user. The guiding mechanism 106 may facilitate or cause the movement of the underwater hull cleaning machine 100 along the external surface to be cleaned. The at least one brush 108 may be raised or lowered to control the pressure contact on the external surface to be cleaned. Alternatively or in addition to, the underwater hull cleaning machine 100 may also be maneuvered in a manner to control the pressure contact of the at least one brush 108 on the external surface to be cleaned.

The base region 104 may include a base plate. A skirting may be coupled to an exterior surface of the base plate and extends outwardly therefrom. In other words, one end or edge of the skirting may be attached to the base plate, while a distal end or edge of the skirting, opposite to the attached end or edge, may form a peripheral end of the base region 104. The skirting may be arranged to surround the at least one brush. In various embodiments, the skirting may be made of a polymer, for example, soft silicon or rubber. The skirting advantageously forms a boundary to enable marine growth and/or other marine contaminants that are being removed from the external surface during the cleaning process to be gathered and effectively collected by the underwater hull cleaning machine 100. The skirting may also provide avoidance of direct contact and/or cushioning effect of contact between the housing 102 and the external surface to be cleaned. This is because as the housing 102 may be made of a rigid material such as metal, such direct contact may result in undesirable damage to the external surface and/or the underwater hull cleaning machine 100.

In the extended position, the at least one brush 108 may extend or protrude beyond the peripheral end of the base region 104. The peripheral end is the part of the base region 104 that faces the external surface to be cleaned when the underwater hull cleaning machine 100 is in operation. For example, the external surface may be a surface of a hull of a vessel, or a hull surface, or part of the ship's hull.

In the retracted position, the at least one brush 108 may retract above the peripheral end of the base region 104 and may substantially be contained within the skirting or the housing 102.

The underwater hull cleaning machine 100 may include a motor configured to drive the at least one brush 108 between the extended position and the retracted position.

In various embodiments, the underwater hull cleaning machine 100 may further include a wheel coupled to the exterior surface of the base plate, within the boundary of the skirting. In some embodiments, three wheels may be employed where each wheel is arranged spaced apart from one another. The wheel(s) may be positioned in close proximity to the skirting so as to act as spacer(s) to minimize or prevent the skirting from collapsing. The wheel(s) may be able to oscillate in multiple directions and may be dimensioned in a manner such that the wheel(s) may be kept substantially within the peripheral end of the base region 104. In other words, generally, the wheel(s) may not protrude beyond the peripheral end. The wheel(s) may be in contact with the external surface to be cleaned when the underwater hull cleaning machine 100 is used. In various embodiments, the wheel(s) may roll along the external surface such that the underwater hull cleaning machine 100 may move or may be maneuvered from one position on the external surface to another position on the external surface. For example, a motor may be provided to drive the wheel(s).

In various embodiments, the guiding mechanism 106 may include a plurality of vectored thrusters spaced apart from one another and arranged in a manner to provide maneuverability of the underwater hull cleaning machine 100 in different directions along a plane substantially parallel to the external surface to be cleaned. In one embodiment, the guiding mechanism 106 may include at least four vectored thrusters. The different directions may include a left direction, a right direction, a frontward direction, a backward direction, or a diagonal direction. The vectored thrusters may also enable the underwater hull cleaning machine 100 to tilt about a longitudinal axis or a latitudinal axis of the underwater hull cleaning machine 100, thereby enabling a rocking movement of the underwater hull cleaning machine 100. In effect, the vectored thrusters allow for 360° rotation of the underwater hull cleaning machine 100.

In various embodiments, the guiding mechanism 106 may include a vertical thruster configured to provide maneuverability of the underwater hull cleaning machine 100 in an upward direction away from the external surface or in a downward direction towards the external surface. In one embodiment, the guiding mechanism 106 may include at least four vertical thrusters. In some embodiments, the guiding mechanism 106 may include the wheel(s) or the at least four vectored thrusters or the at least four vertical thrusters, or any combination thereof. The underwater hull cleaning machine 100 may be allowed to move easily and more freely with the thrusters and the wheel(s).

The vectored thrusters and the vertical thrusters may provide a thrusting mechanism arranged to provide a force opposing a drift experienced by the underwater hull cleaning machine 100 so that the underwater hull cleaning machine 100 is able to continue moving along the external surface with the at least one brush 108 in the retracted position. The force may be a propulsive force. In other words, the thrusting mechanism may be activated to keep the cleaning machine 100 substantially near the external surface and move along the external surface via the guiding mechanism 106 when the at least one brush 108 is in the retracted position. The wheels (e.g., arranged in the three-wheel configuration) may act as spacer(s) to provide clearance between the underwater hull cleaning machine 100 and the external surface so as to prevent the machine 100 from crushing into the external surface by the thrusting mechanism. This may allow for a controlled continual cleaning process to be performed. The thrusters may be positioned, for example, along the peripheral of the underwater hull cleaning machine 100.

In various embodiments, the guiding mechanism 106 may include a gyro sensor configured to ascertain at least one of a direction that the underwater hull cleaning machine 100 is heading, a position of the underwater hull cleaning machine 100 relative to the external surface, a pitch of the underwater hull cleaning machine 100, or a roll of the underwater hull cleaning machine 100. In other words, the gyro sensor (or also referred to as a gyro sensor mechanism) may ascertain the position of machine heading and pitch and roll, which allows an operator to know the exact position of the cleaning machine 100 when it is deployed to clean the vessel/ship underwater.

In various embodiments, the underwater hull cleaning machine 100 may further include a further brush configured to move between the extended position and the retracted position, wherein in the extended position, the further brush is extended downwardly towards the base region 104 to be in contact with the at least part of the external surface, and in the retracted position, the further brush is moved upwardly away from the base region 104 to be free from contact with the external surface.

In some embodiments, the further brush may be positioned or located adjacent to the at least one brush 108. For example, the guiding mechanism 106 or the wheel may be positioned between the at least one brush 108 and the further brush.

In one embodiment, the at least one brush 108 and the further brush may be configured to move between the extended position and the retracted position synchronously with each other.

In another embodiment, the at least one brush 108 and the further brush may be configured to move between the extended position and the retracted position asynchronously with respect to each other. In other words, the movement of the at least one brush 108 and the further brush may be independent from each other. In some embodiments, the at least one brush 108 may additionally refer to the further brush.

In various embodiments, the underwater hull cleaning machine 100 may further include a pressure gauge configured to detect an amount of force being applied to the external surface in response to a surface torque of the at least one brush 108. For example, when the pressure gauge detects the amount of force to be more than a pre-determined level, the underwater hull cleaning machine 100 may be adjusted in terms of its position and/or the at least one brush 108 may be adjusted in terms of its extending position and/or rotational speed to provide surface torque control, thereby reducing the chances of damage to the external surface to be cleaned, while maintaining adequate cleaning.

In various embodiments, the underwater hull cleaning machine 100 may further include a camera configured to capture a real-time image of the external surface or a part thereof. The camera may be adjustable to capture different types of images, for example, images of a part or an area of the external surface that is located away from the peripheral of the underwater hull cleaning machine 100 at a general view and a closed-up view of distance ranging from 0 m to about 20 m. The camera may also be adjustable to capture close-up or zoomed-in images, and far-off or zoomed-out images.

The real-time image or images may be displayed on a monitor. The monitor may be remotely arranged with respect to the cleaning machine 100. For example, the monitor may be arranged on a service vessel. The real-time image or images may provide information to the operator who may be remotely controlling the underwater hull cleaning machine 100. The information may include, for example, whether the external surface or the part thereof is fouled by marine growth or not.

In other words, the real-time images may allow the fouling conditions of the external surface to be visualized by the operator, who may remotely control the raising and lowering of the at least one brush 108. For example, when the operator observes fouling conditions on the external surface through the camera, the at least one brush 108 (e.g., three brushes) may be lowered with surface torque control for cleaning. Conversely, when the operator observes no marine fouling on the external surface through the camera, the at least one brush 108 (e.g., three brushes) may be raised to have no surface contact on the anti-fouling coating of the hull; thereby no cleaning is being carried out on the non-fouling surface. This way, the operator is able to determine and decide cleaning to be performed only on specific fouled areas with marine fouling. The operator is also able to decide in situ on how much surface contact pressure is to be applied to clean the surface without damaging the ship's coating with the surface torque control.

Residues and harmful marine growths captured during cleaning may be disposed of in an environmental-friendly manner instead of being discharged into the sea as done using traditional methods.

For example, the underwater hull cleaning machine 100 may further include a submersible pump configured to kill marine growth removed from the surface of the hull when the marine growth goes through the pump mechanism. The marine growth may be removed during the cleaning process performed by the underwater hull cleaning machine 100.

In various embodiments, the underwater hull cleaning machine 100 may further include a pump configured to transfer a suspension including marine growth removed from the external surface to an external filtering system. For example, the pump may be configured to transfer the removed marine growth into an external tank. The pump and the external tank may be coupled to each other via a conduit. The external tank may refer to a filtering tank that may be located onboard a servicing vessel.

In some example, the pump may include the submersible pump. In other examples, the pump and the submersible pump may form a unitary device.

Figure 1B:
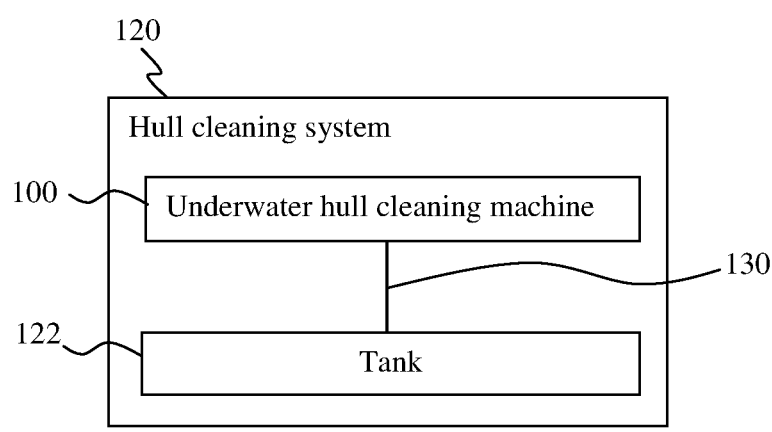
FIG. 1B shows a schematic representation of a hull cleaning system, in accordance with various embodiments.

FIG. 1B shows a schematic representation of a hull cleaning system 120, in accordance with various embodiments.

In FIG. 1B, the hull cleaning system 120 includes an underwater hull cleaning machine 100 in accordance with various embodiments; and a tank 122 arranged to receive marine growth and/or contaminants removed by the underwater hull cleaning machine 100. The tank 122 and the underwater hull cleaning machine 100 may be in fluid communication with each other as denoted by a line 130.

The tank 122 may be located remotely from the underwater hull cleaning machine 100. For example, the tank 122 may be located on a servicing vessel (or interchangeably referred to as a service vessel) from which the underwater hull cleaning machine 100 may be deployed. The tank 122 may refer to the external tank or filtering tank described above. The operator controlling the underwater hull cleaning machine 100 may also be stationed within or on the servicing vessel.

The hull cleaning system 120 may further include a filtering system configured to separate the marine growth and/or contaminants and seawater from a suspension transferred through a pump of the underwater hull cleaning machine 100. The seawater separated from the suspension may be returned back to the sea/ocean, while the marine growth and/or contaminants separated from the suspension may be held in the tank 122.

In other words, the hull cleaning system 120, in accordance with various embodiments, may provide a reclaim hull cleaning system, which is environmental friendly by allowing marine animals (or marine growth) to be killed/reclaimed as well as other contaminants to be reclaimed through the pump and filtered through the filtering system where marine fouling cleaned from the ship, together with other contaminants, may be trapped/retained in the tank 122.

Some examples of contaminants may include marine life micro-organisms such as bacteria and diatoms.

The filtering system may be located remotely from the underwater hull cleaning machine 100. For example, the filtering system may be located on the servicing vessel. The filtering system may refer to the external filtering system described above.

Figure 1C:
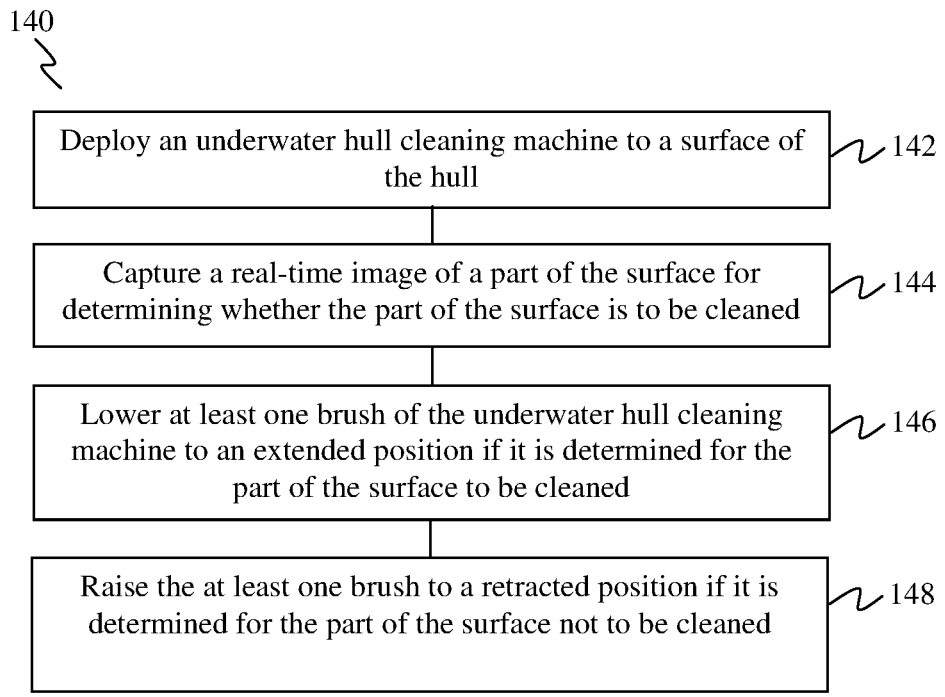
FIG. 1C shows a flow chart illustrating a method of cleaning a hull of a ship or vessel, according to various embodiments

FIG. 1C shows a flow chart illustrating a method of cleaning a hull of a ship or vessel, according to various embodiments.

In FIG. 1C, the method for cleaning the hull of the vessel 140 is provided. In 142, the underwater hull cleaning machine (e.g., 100) may be deployed to a surface of the hull. In 144, a real-time image of a part of the surface may be captured (e.g., by ways of a camera or CCTV) for determining whether the part of the surface is to be cleaned. In 146, at least one brush (e.g., 108) of the underwater hull cleaning machine 100 may be lowered to an extended position if it is determined for the part of the surface to be cleaned. In the extended position, the at least one brush 108 may extend downwardly towards a base region (e.g., 104) of the underwater hull cleaning machine 100 and may contact with the part of the surface. In 148, the at least one brush 108 may be raised to a retracted position if it is determined for the part of the surface not to be cleaned. In the retracted position, the at least one brush 108 may move upwardly away from the base region 104 and may be free from contact with the surface.

The operator may determine for the part of the surface to be cleaned or for the part of the surface not to be cleaned. This may depend on whether there is marine growth fouling the surface or the level/degree of fouling on the surface.

In various embodiments, the method 140 may further include activating the at least one brush 108 when in the extended position for cleaning and removing marine growth and/or contaminants from the part of the surface of the hull. In other words, the at least one brush 108 may be activated to rotate axially to perform a cleaning action.

In various embodiments, the method 140 may further include maneuvering the underwater hull cleaning machine 100 from the part of the surface of the hull to another part of the surface.

For example, the at least one brush 108 may include two or more brushes. When the two or more brushes are activated, the rotational speed of the brushes may be sufficiently high to cause a vacuum to be formed therebetween. The vacuum enables a suction capability which allows the underwater hull cleaning machine 100 to hover over the external surface or hold on to the external surface, even when the vertical thrusters are deactivated. Thus, the vertical thrusters may be activated only at times when the brushes are not in use, for example, when there is no need for cleaning of a particular part of the external surface, so as to enable the underwater hull cleaning machine 100 to hover over the external surface and move to another part for the cleaning to resume.

The method 140 may further include collecting the removed marine growth and/or contaminants for reclaiming. For example, the step of collecting the removed marine growth and/or contaminants may include transferring and filtering out the removed marine growth and/or contaminants to a tank for reclaiming. The tank may refer to the tank (e.g., 122) of the hull cleaning system 120.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

The method of cleaning a hull of a ship or vessel, according to various embodiments, will be described in details as follow.

Figure 2A:
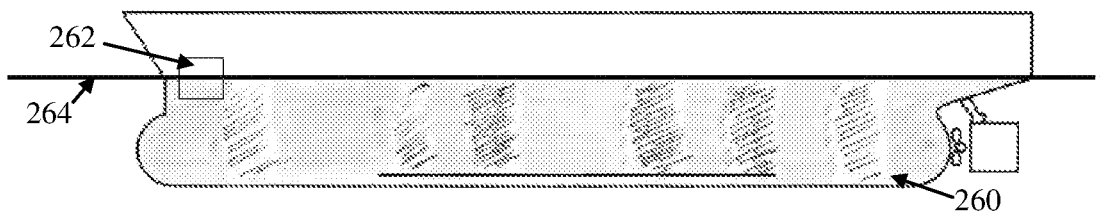
FIG. 2A shows a schematic drawing illustrating a side (port) view of a ship's hull and a service vessel from which the underwater hull cleaning machine is deployed, in accordance with one embodiment.

FIG. 2A shows a schematic drawing illustrating a side (port) view of a ship's hull 260 and a service vessel 262 from which the underwater hull cleaning machine 200 is deployed, in accordance with one embodiment.

In FIG. 2A, the service vessel 262 is arranged alongside the ship's hull 260. The service vessel 262 may provide the hull cleaning system in accordance with various embodiments. The underwater hull cleaning machine 200 (not shown in FIG. 2A) may be placed on the deck of the service vessel 262 awaiting deployment below a sea level 264 for cleaning the hull 260.

Figure 2B:
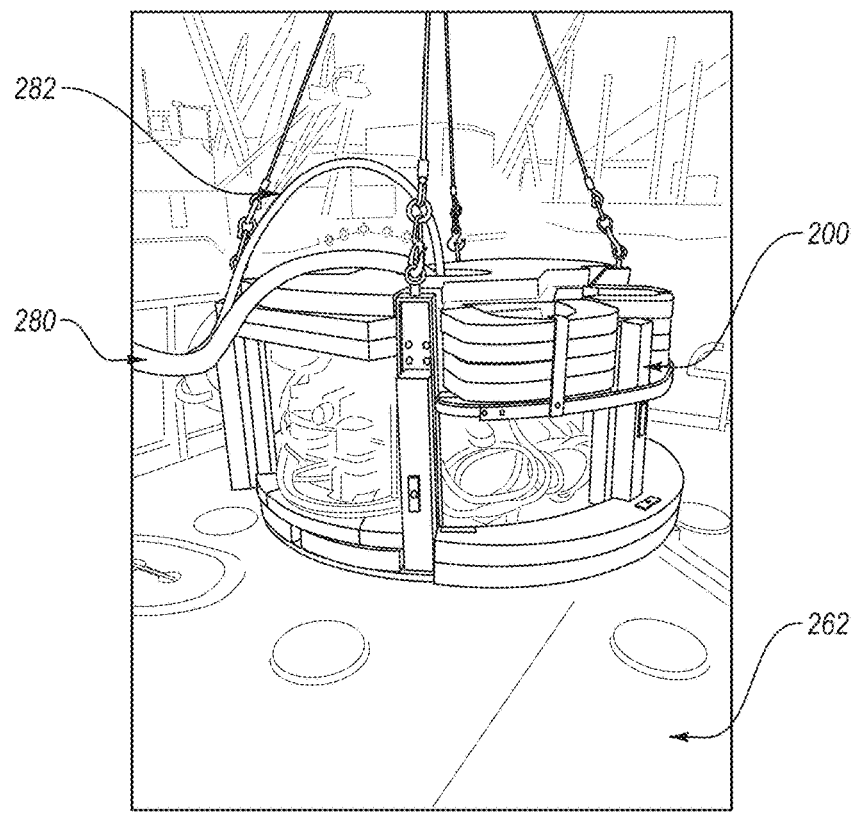
FIG. 2B shows a photographic perspective view depicting an example of the underwater hull cleaning machine ready for deployment, in accordance with one embodiment.

FIG. 2B shows a photographic perspective view depicting an example of the underwater hull cleaning machine 200 ready for deployment, in accordance with one embodiment.

The underwater hull cleaning machine 200 may be described in similar context to the underwater hull cleaning machine 100 of FIGS. 1A and 1B.

More specifically, the underwater hull cleaning machine 200 may include the same or like elements or components as those of the underwater hull cleaning machine 100 of FIG. 1A, and as such, the same ending numerals are assigned and the like elements may be as described in the context of the underwater hull cleaning machine 100 of FIG. 1A, and therefore the corresponding descriptions are omitted here.

As shown in FIG. 2B, a conduit 280 may be coupled or connected between the underwater hull cleaning machine 200 and the service vessel 262 to allow removed marine growth from the cleaning process to be transferred into a tank provided on the service vessel 262. A connecting sleeve (or tether) 282 may be coupled or connected between the underwater hull cleaning machine 200 and the service vessel 262 to contain (or hold) electrical wirings. The electrical wirings may be required for connecting up the electrical and electronics components of the underwater hull cleaning machine 200 to an electrical source or an electronic device (not shown in the figures).

For example, the electrical components may include the pump(s), the brushes or a motor driver of the brushes, a motor driver for the wheel, the camera, or the thrusting mechanism, as described hereinabove. The electronic device may include, e.g., the monitor to which the camera is connected, a controller for the brushes or the motor driver thereof, a controller for the thrusting mechanism, or a controller to operate the motor driver for the wheel. The electrical source may include a dc (direct current) supply and/or an ac (alternating current) supply.

Figure 2C:
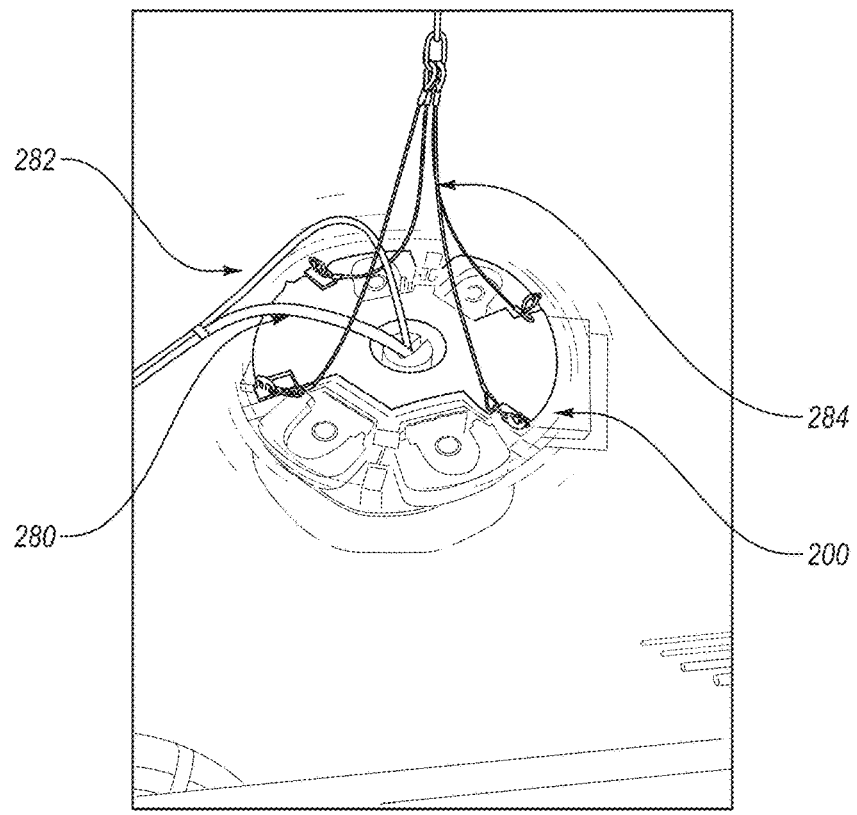
FIG. 2C shows a photographic perspective view depicting the exemplary underwater hull cleaning machine of FIG. 2B being deployed into the sea, in accordance with one embodiment.

FIG. 2C shows a photographic perspective view depicting the exemplary underwater hull cleaning machine 200 of FIG. 2B being deployed into the sea, in accordance with one embodiment. In FIG. 2C, the underwater hull cleaning machine 200 is lowered into the sea by suspension cables 284 coupled to a crane or launch and recovery system (LARS) (not shown in figures), which may be provided by the service vessel 262.

Figure 2D:
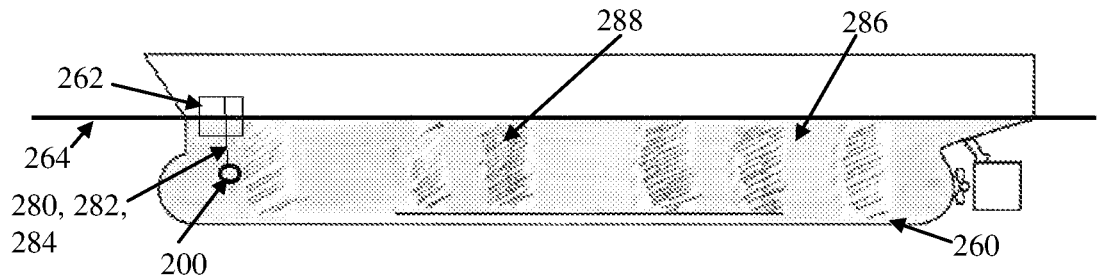
FIG. 2D shows a schematic drawing illustrating the side (port) view of the ship's hull where the underwater hull cleaning machine may be lowered to a desired level under the sea level to reach the surface to be cleaned at one end of the hull, in accordance with one embodiment.

FIG. 2D shows a schematic drawing illustrating the side (port) view of the ship's hull where the underwater hull cleaning machine 200 may be lowered to a desired level under the sea level 264 to reach the surface to be cleaned at one end of the hull 260.

When fouling or biofouling is observed on the surface of the hull 260 (as depicted by solid shaded areas 286 in FIG. 2D), the brush or brushes (e.g., 108) of the underwater hull cleaning machine 200 may be lowered to the extended position, thereby having contact with the surface to be cleaned. Cleaning may be proceeded using surface torque control, as described herein. During the cleaning process, the underwater hull cleaning machine 200 may move laterally via the guiding mechanism (or wheel) (e.g., 106) to a different part of the surface.

Figure 2E:
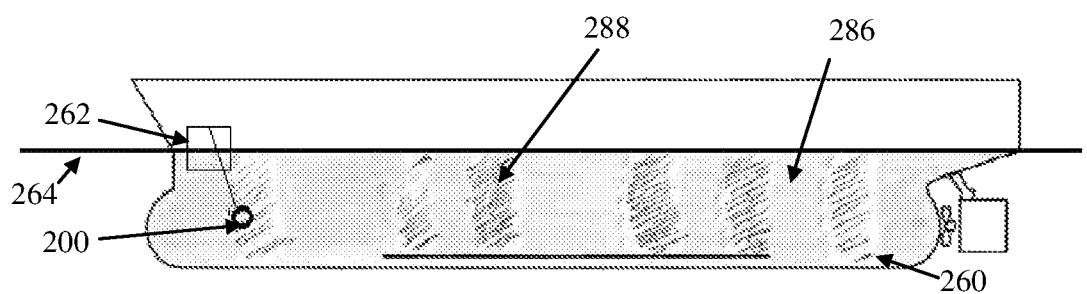
FIG. 2E shows a schematic drawing illustrating the side (port) view of the ship's hull where the underwater hull cleaning machine moves to the different part of the surface, with respect to FIG. 2D.

FIG. 2E shows a schematic drawing illustrating the side (port) view of the ship's hull where the underwater hull cleaning machine 200 moves to the different part of the surface.

When no fouling is observed on this different part of the surface (as depicted by line shaded areas 288 in FIG. 2E), the brush or brushes (e.g., 108) of the underwater hull cleaning machine 200 may be raised to the retracted position, thereby being free from contact with the non-fouling surface (as shown in FIG. 2E). This way, no cleaning may be performed on the non-fouling surface.

The underwater hull cleaning machine 200 may continue to move laterally via the wheel (e.g., 106) along this different part of the non-fouling surface. When a subsequent part of the surface is observed with fouling, the brush or brushes (e.g., 108) of the underwater hull cleaning machine 200 may be lowered once again to the extended position for performing the cleaning. This may repeat until the underwater hull cleaning machine 200 reaches an opposite end of the hull 260. Thereafter, the underwater hull cleaning machine 200 may brought to a deeper level under the sea level 264 and the underwater hull cleaning machine 200 may move laterally from the opposite end of the hull 260 to the initial end of the hull 260, while executing the cleaning process with the surface torque control.

When at least part of the base of the hull 260 is cleaned, the underwater hull cleaning machine 200 may be brought to the other side (starboard) of the hull 260 for cleaning. In some examples, the underwater hull cleaning machine 200 may be retrieved back onto the deck of the service vessel 262 and the service vessel 262 may move to the starboard side of the hull 260 to have the underwater hull cleaning machine 200 deployed again for cleaning the surface at the starboard side with the surface torque control. By doing so, the underwater hull cleaning machine 200 may be kept substantially close relative to the service vessel 262, without having the need to dispense significant lengths of the connecting sleeve 282 and/or the conduit 280.

Figure 2F:
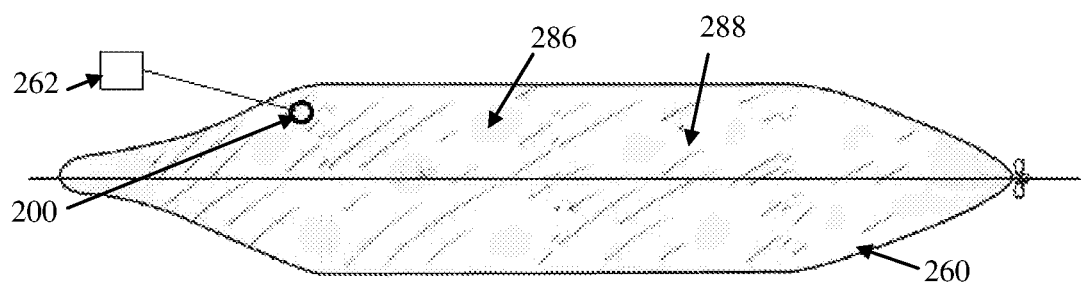
FIG. 2F shows a schematic drawing illustrating a bottom view of the hull with respect to FIGS. 2A, 2D and 2E.

When the substantially entire port side of the hull 260 is selectively cleaned, the underwater hull cleaning machine 200 may brought to a base (or flat) of the hull 260 for cleaning with the surface torque control. FIG. 2F shows a schematic drawing illustrating a bottom view of the hull 260. In FIG. 2F, the brush or brushes (e.g., 108) of the underwater hull cleaning machine 200 may be lowered to the extended position, thereby having contact with the fouling surface 286 (at the base of the hull 260) to be cleaned. The brush or brushes (e.g., 108) of the underwater hull cleaning machine 200 may then be raised to the retracted position when the non-fouling surface 288 at the base of the hull 260 is reached.

Figure 2G:
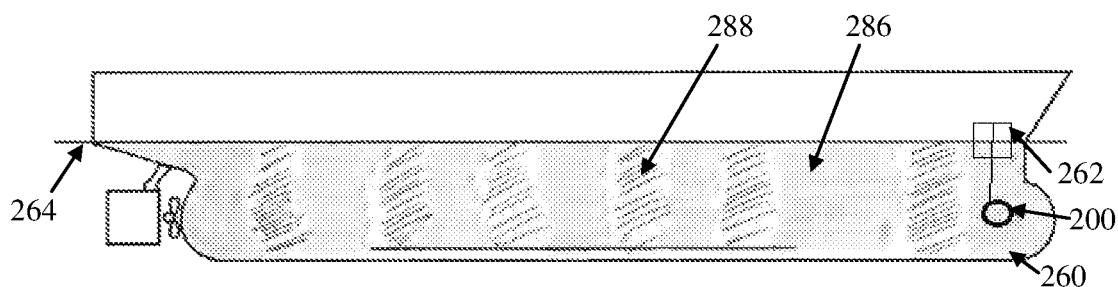
FIG. 2G shows a schematic drawing illustrating the side (starboard) view of the ship's hull where the underwater hull cleaning machine may be lowered to a desired level under the sea level to reach the surface to be cleaned at one end of the hull, in accordance with one embodiment.

FIG. 2G shows a schematic drawing illustrating the side (starboard) view of the ship's hull where the underwater hull cleaning machine 200 may be lowered to a desired level under the sea level 264 to reach the surface to be cleaned at one end of the hull 260. The cleaning process for the starboard side of the hull 260 may be described in similar context to that for the port side of the hull 260.

The marine growth removed from the surfaces of the hull 260 may be reclaimed/killed by the pump(s) of the underwater hull cleaning machine 200. These marine growth may be transferred via the conduit 280 to the filtering system (e.g., which may be provided on the service vessel 262) to be filtered from the seawater and stored in the tank (e.g., which may also be provided on the service vessel 262). The filtered seawater may then be returned into the sea, thereby providing an environmental-friendly cleaning operation.

It should be understood and appreciated that the cleaning operations may be carried out while the ship, having its hull 260 to be cleaned, is berthed alongside for, e.g., loading or unloading operations or at anchorages. Further, as the cleaning operation does not require intervention of a diver, the risk to human life is altogether eliminated. The diver-less cleaning operation advantageously provides a desirable safe environment for underwater hull cleaning.

It should also be appreciate that the concept of the hull cleaning system and/or the underwater hull cleaning machine, in accordance with various embodiments, is a total package providing a long-awaited technical solution involving selective cleaning with surface torque control and/or a reclaim/filtering system.

Details of the underwater hull cleaning machine (e.g., 100, 200) according to various embodiments and the surface torque control will be described as follow.

When in use, the base region (e.g., 104) of the underwater hull cleaning machine (e.g., 100) may be arranged substantially near to the external surface (e.g., the hull 260), or in contact with at least part of the external surface.

FIGS. 3A to 3D show snapshots of an animated simulation seen from a side view at different instances, illustrating the movement of the at least one brush (e.g., 108) of the underwater hull cleaning machine (e.g., 100) relative to the external surface 360 (e.g., the hull 260 or a part thereof) in a forward direction as indicated by an arrow 350, in accordance with various embodiments.

Figure 3A:
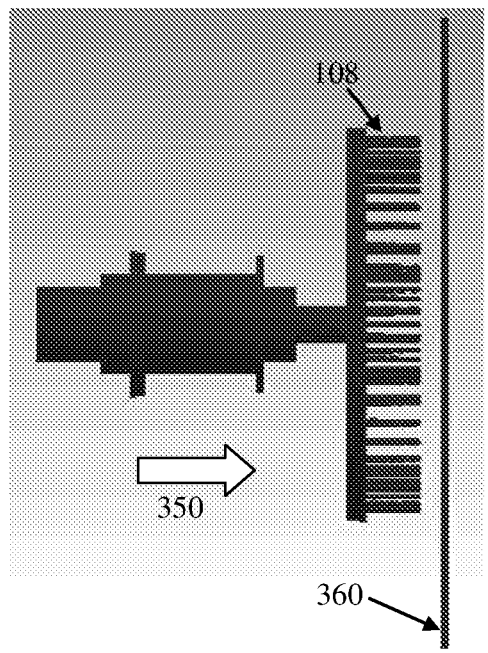
FIGS. 3A to 3D show snapshots of an animated simulation seen from a side view at different instances, illustrating the movement of the at least one brush of the underwater hull cleaning machine relative to the external surface in a forward direction, in accordance with various embodiments.
Figure 3B:
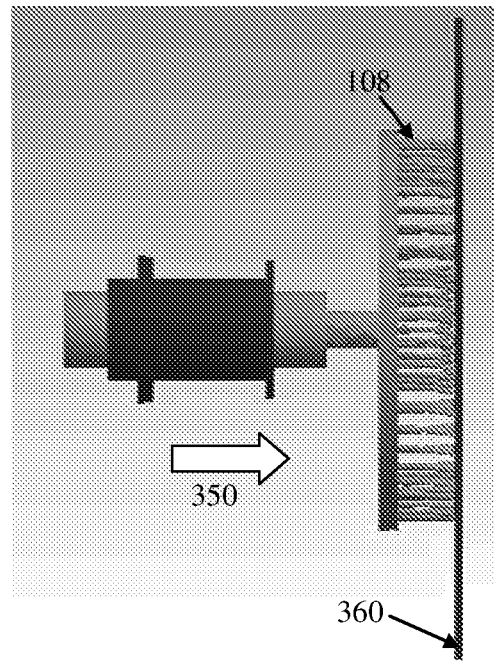
Figure 3C:
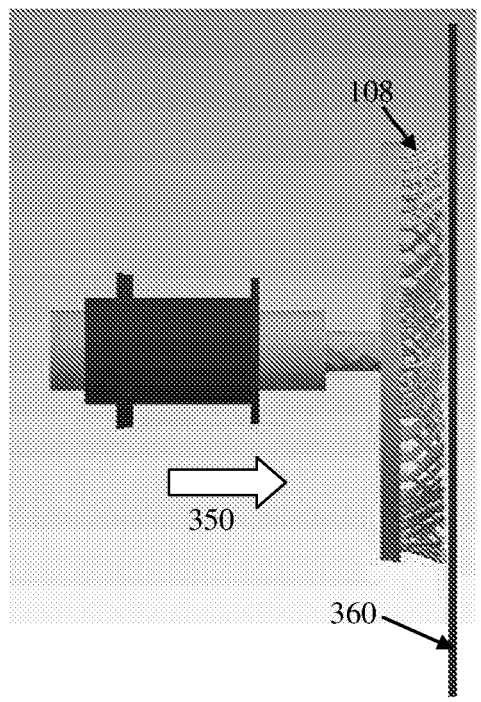
Figure 3D:
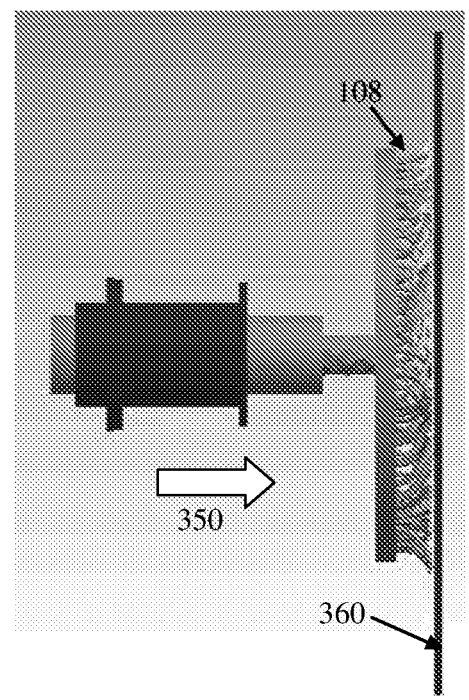

In FIG. 3A, the brush 108 is in the retracted position and is free from contact with the surface 360. The brush 108 may experience 0 m of deformation. The brush 108 may then be moved toward the surface 360 in the direction 350. When the brush 108 just touches the surface 360, the brush 108 may experience about 0.03 m of deformation, as shown in FIG. 3B. The brush 108 may move further in the direction 350 and may experience further deformation of about 0.04 m, as shown in FIG. 3C. To allow maximum contact with the surface 360 for thorough or deep cleaning purposes, the brush 108 may move in the direction 350, with about 0.05 m deformation, as shown in FIG. 3D. In other words, the brush 108 may be adjusted along the direction 350 to provide different contact pressure on the surface 360. The brush 108 may rotate axially when moving in the direction 350 to enable the cleaning of the surface 360. Different contact pressure of the brush 108 on the surface 360 may translate to different levels or degrees of cleaning. For example, lower contact pressure may relate to light cleaning for mildly fouled surfaces, and higher contact pressure may relate to deep or severe cleaning of heavily fouled surfaces.

FIG. 3E shows a perspective view of FIG. 3D.

When the brush 108 of the cleaning machine is in the extended position (e.g., as shown in any one of FIGS. 3B to 3D), the brush 108 may also be moved in a lateral direction as indicated by an arrow 352 to clean another part of the surface 360. The brush 108 may be moved laterally as facilitated by the guiding mechanism (e.g., 106) of the cleaning machine.

While the brush 108 moves laterally, the brush 108 may remain in a constant extended position, or may be adjusted to various extension levels of the extended position.

FIGS. 4A and 4B show snapshots of an animated simulation seen from the side view at different instances, illustrating the movement of the at least one brush 108 relative to the external surface 360 in a reverse direction as indicated by an arrow 450, in accordance with one embodiment.

When a part of the surface 360 is not to be cleaned, the brush 108 may be moved from the extended position (as shown in FIG. 4A) to the retracted position (as shown in FIG. 4B). When at the retracted position, the brush 108 may not perform any cleaning and may continue to move laterally (e.g., in direction 352) as facilitated by the guiding mechanism of the cleaning machine to reach a subsequent part of the surface 360 for cleaning, where required.

The lateral movement of the brush 108 may also be controlled opposite to the direction 352. This way, the brush 108 may, for example, be allowed to back track its cleaning path.

Figure 5A:
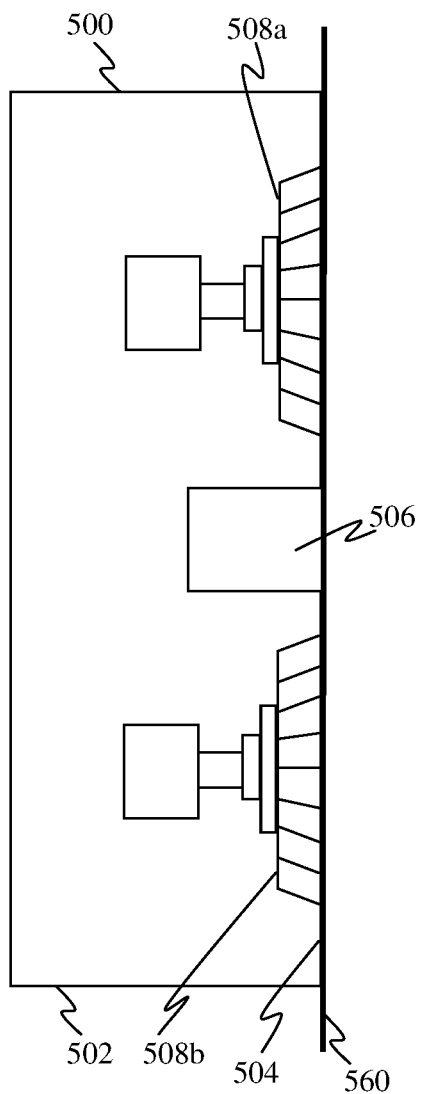
FIG. 5A shows a schematic drawing illustrating a cross-sectional side view of an underwater hull cleaning machine including two brushes at an extended position, in accordance with one embodiment.
Figure 5B:
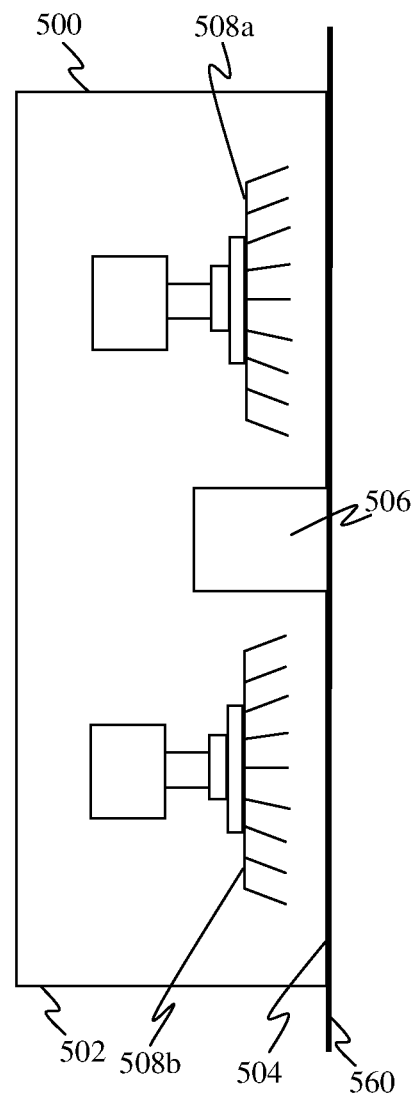
FIG. 5B shows a schematic drawing illustrating a cross-sectional side view of the underwater hull cleaning machine of FIG. 5A with the brushes at a retracted position, in accordance with one embodiment.

FIG. 5A shows a schematic drawing illustrating a cross-sectional side view of an exemplary underwater hull cleaning machine 500 including two brushes 508a, 508b at an extended position, in accordance with one embodiment. FIG. 5B shows a schematic drawing illustrating a cross-sectional side view of the underwater hull cleaning machine 500 of FIG. 5A with the brushes 508a, 508b at a retracted position, in accordance with one embodiment.

The underwater hull cleaning machine 500 may include a housing 502 that holds or houses the brushes 508a, 508b and a wheel 506.

The underwater hull cleaning machine 500 may include the same or like elements or components as those of the underwater hull cleaning machine 100 of FIG. 1A; 200 of FIGS. 2B to 2G, and as such, the same ending numerals are assigned and the like elements may be as described in the context of the underwater hull cleaning machine 100 of FIG. 1A; 200 of FIGS. 2B to 2G, and therefore the corresponding descriptions are omitted here.

In FIG. 5A, the brushes 508a, 508b of the underwater hull cleaning machine 500 are lowered toward a base region 504 of the cleaning machine 500 to be in contact with a surface 560 (e.g., a part of a hull with anti-fouling coating) to clean the surface 560 if the surface 560 is fouled by marine growth. In this case, the brushes 508a, 508b may be in the extended position. The thrusting mechanism (not shown in FIG. 5A) and the wheel 506 of the cleaning machine 500 enable the cleaning machine 500 to move along the surface 560 to reach various or all parts of the hull to be cleaned.

When the cleaning machine 500 reaches a surface 560 e.g., with no fouling (as shown in FIG. 5B), the brushes 508a, 508b are raised away from the base region 504 to be free from contact with the surface 560 (e.g., with no fouling). In this case, the brushes 508a, 508b may be in the retracted position.

In some examples, the brushes 508a, 508b may be independently controlled. In other example, the brushes 508a, 508b may be controlled in a ganged manner.

In FIGS. 5A and 5B, the base region 504 may be in contact with at least part of the surface 560. It should be appreciated and understood that in other embodiments, the base region 504 may be arranged substantially near to the surface 560 or a part thereof, without the housing 502 being in direct contact with the surface 560.

Figure 5C:
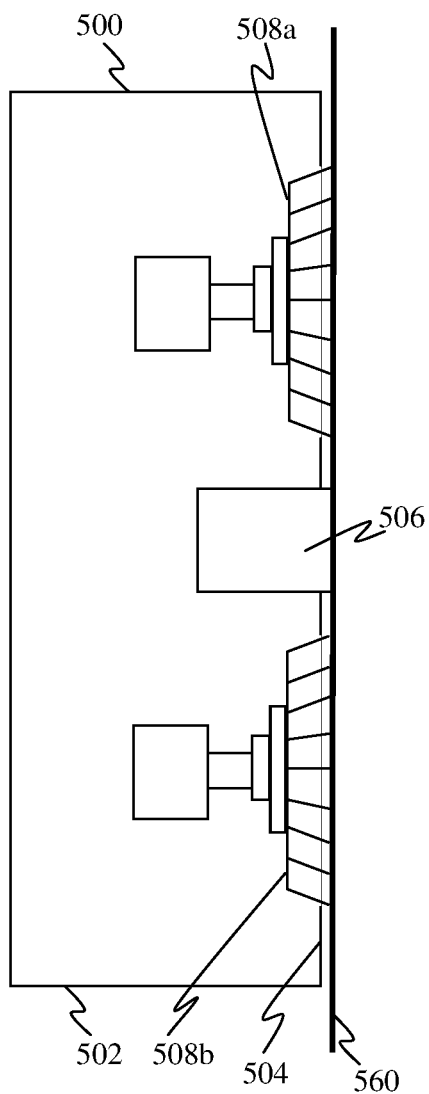
FIG. 5C shows a schematic drawing illustrating a cross-sectional side view of the underwater hull cleaning machine being place substantially near the external surface and with the brushes at the extended position, in accordance with one embodiment.
Figure 5D:
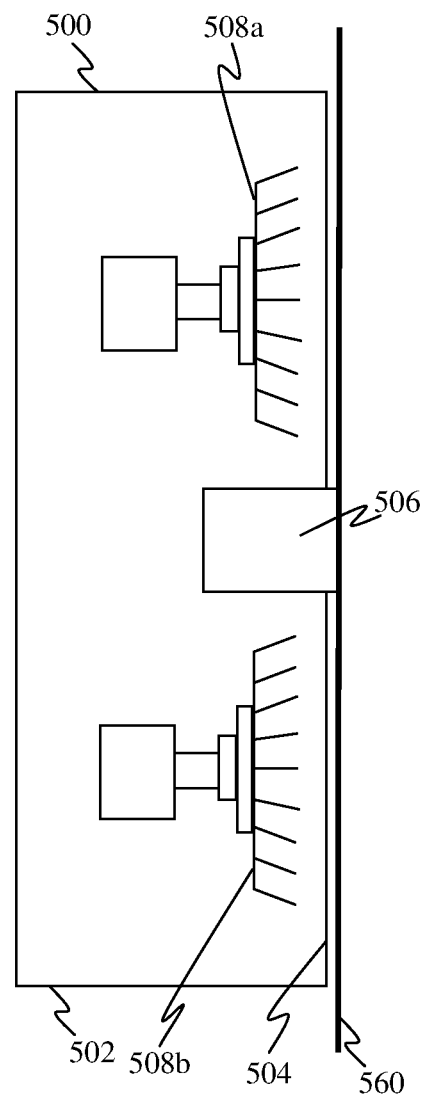
FIG. 5D shows a schematic drawing illustrating a cross-sectional side view of the underwater hull cleaning machine of FIG. 5C with the brushes at the retracted position, in accordance with one embodiment.

FIG. 5C shows a schematic drawing illustrating a cross-sectional side view of the underwater hull cleaning machine 500 with the brushes 508a, 508b at an extended position and being place substantially near the surface 560, in accordance with one embodiment. FIG. 5D shows a schematic drawing illustrating a cross-sectional side view of the underwater hull cleaning machine 500 of FIG. 5C with the brushes 508a, 508b at a retracted position, in accordance with one embodiment.

As shown in FIG. 5D, the cleaning machine 500 may move along the surface 560 to reach various or other parts of the hull via the wheel 506, even with the brushes 508a, 508b in the retracted position. The thrusting mechanism, as described herein, may be used for the retention and the continuous navigational capability of the cleaning machine 500.

In FIG. 5C, the brushes 508a, 508b may extend to and out from a baseline (or peripheral end) of the base region 504 to reach the surface 560 or a part thereof for cleaning. In other words, the brushes 508a, 508b may protrude from the baseline of the base region 504 in the extended position.

The degree or level of surface pressure being applied to the surface 560 may depend on the positions of the lowered brushes 508a, 508b, as described in similar context to FIGS. 3A to 3D. With different degrees or levels of surface pressure applied, the types of cleaning may be controlled. For example, with increased deformation of the brushes 508a, 508b, severe cleanings may be achieved. Meanwhile, with decreased deformation of the brushes 508a, 508b, mild or light cleanings may be achieved. The types of cleaning may be applicable based on the amount of biofouling on the surface 560. It should also be appreciated that the different degrees or levels of surface pressure applied may alternatively or additionally be adjusted using the thrusting mechanism to control the relative distance between the cleaning machine 500 (and thus, the brushes 508, 508b) and the external surface 560.

Figure 6A:
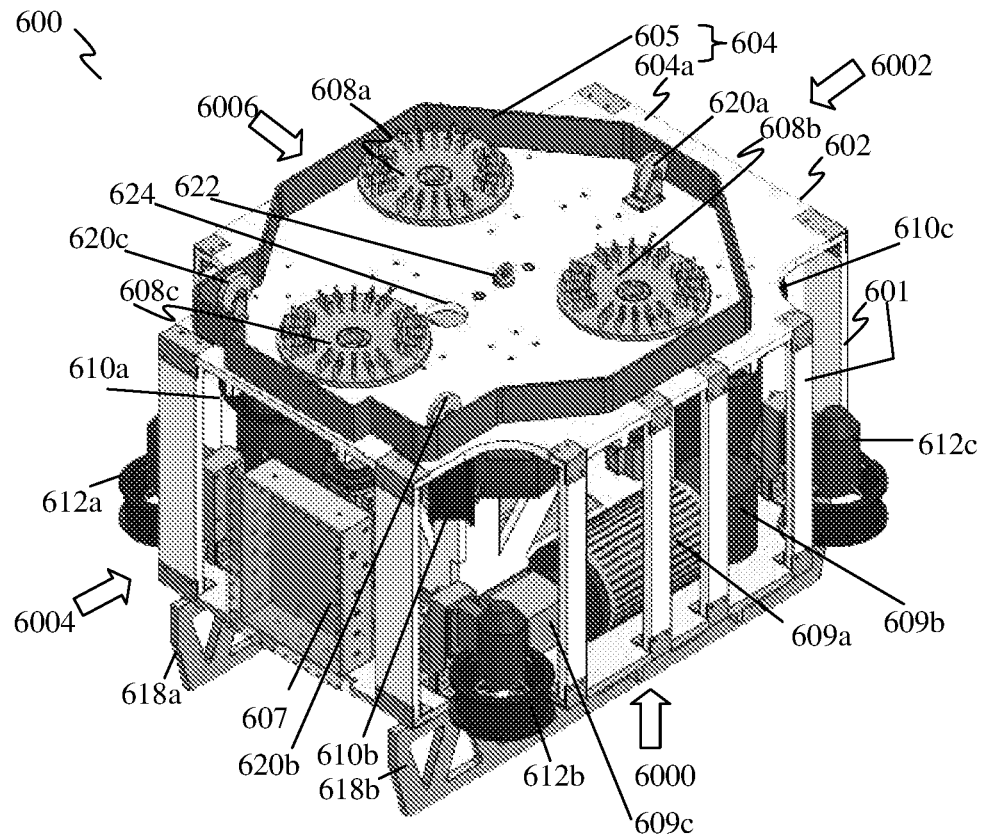
FIG. 6A shows a perspective view of an underwater hull cleaning machine having three brushes, in accordance with one embodiment.
Figure 6B:
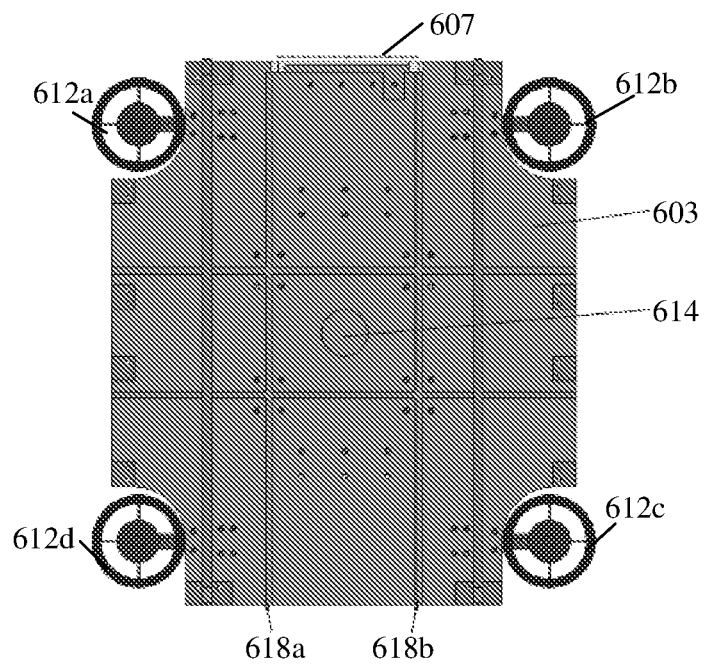
FIG. 6B shows a bottom view of FIG. 6A.
Figure 6C:
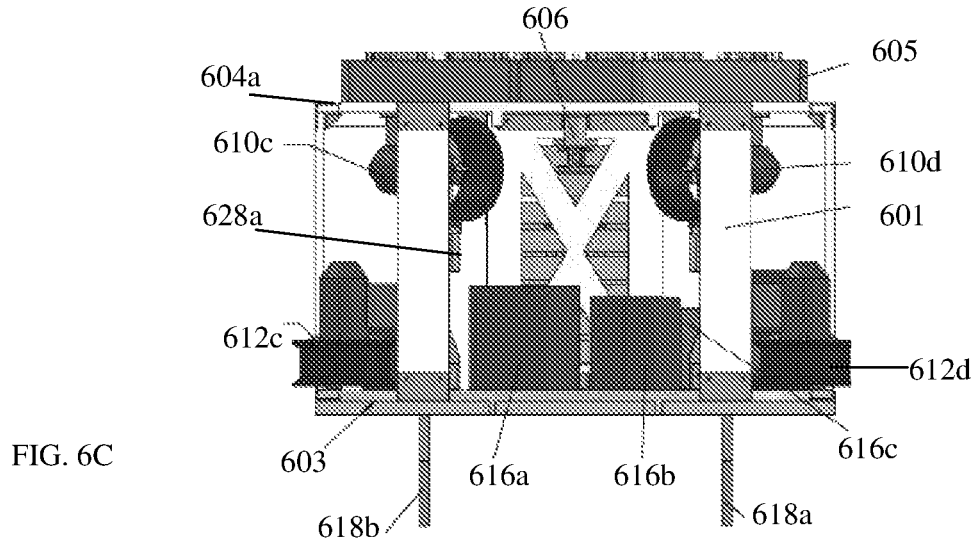
FIG. 6C shows a forward view of FIG. 6A.
Figure 6D:
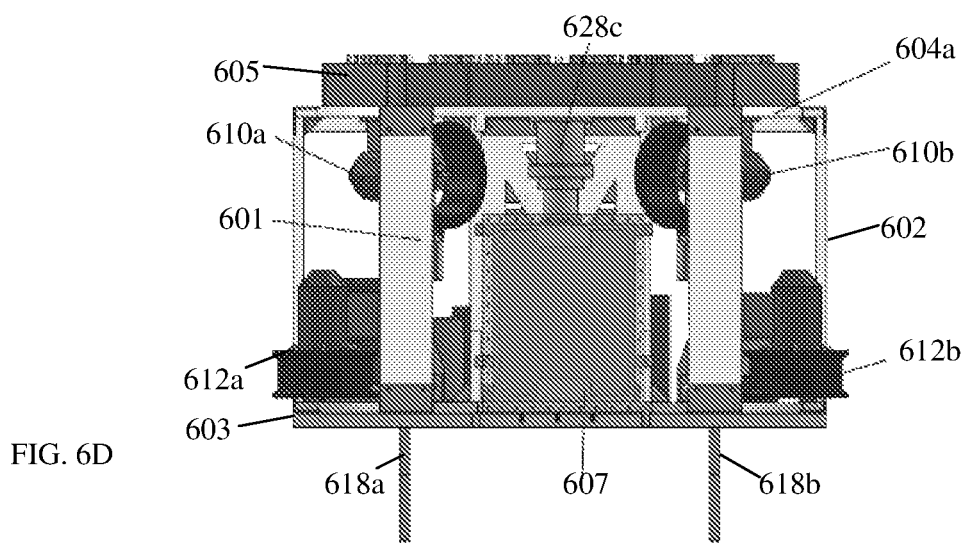
FIG. 6D shows an aft view of FIG. 6A.
Figure 6E:
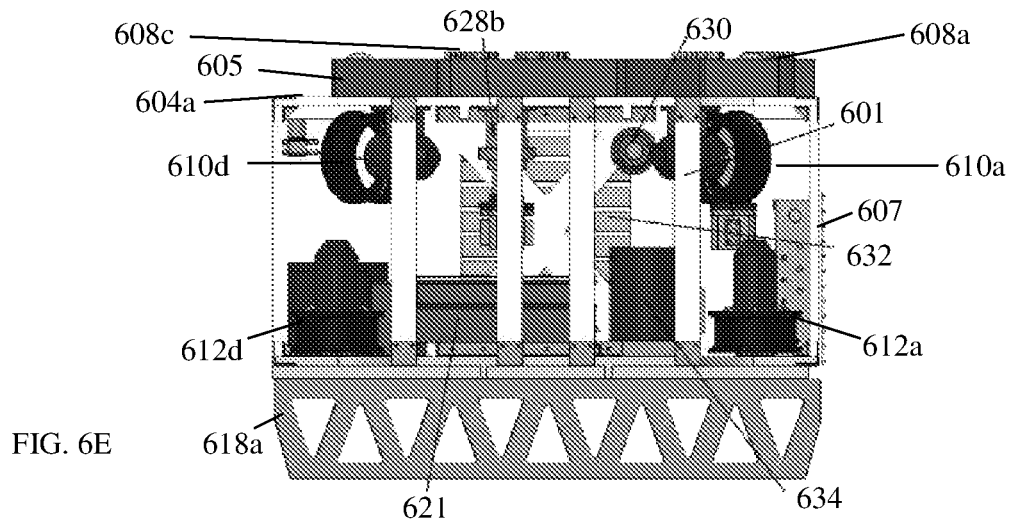
FIG. 6E shows a port (side) view of FIG. 6A.

FIG. 6A shows a perspective view of another exemplary underwater hull cleaning machine 600 having three brushes, in accordance with one embodiment. FIGS. 6B to 6E respectively show a bottom view (as seen from a direction denoted by an arrow 6000), a forward view (as seen from a direction denoted by an arrow 6002), an aft view (as seen from a direction denoted by an arrow 6004) and a port (side) view (as seen from a direction denoted by an arrow 6006) of FIG. 6A. The underwater hull cleaning machine 600 may be described in similar context to the underwater hull cleaning machine 100 of FIG. 1A. In FIGS. 6A to 6E, the underwater hull cleaning machine 600 is provided with a housing 602 and may include three brushes 608a, 608b, 608c arranged along a triangular profile towards a base region 604 of the hull cleaning machine 600. The base region 604 may include a skirting 605 extending outwardly from an exterior surface of a base plate 604a. The skirting 605 may be used to trap fouling (e.g., the marine growth and/or contaminants obtained/removed during the hull cleaning process) from escaping into sea. The fouling may be collected through a suction inlet 624 which may be coupled to a de-water pump (or conduit) 632. In FIGS. 6A to 6E, the three brushes 608a, 608b, 608c are in a retracted position, enclosed within a boundary formed by the skirting 605. When in operation, the three brushes 608a, 608b, 608c may move to an extended position to raise above the height of the skirting 605 to reach an external surface to be cleaned (not shown). Each of the three brushes 608a, 608b, 608c may be controlled to extend or retract independently. This allows flexibility in terms of the amount of area to be cleaned at any one time. The brushes 608a-608c may be coupled to respective brush drivers 628a, 628b, 628c. A vacuum may be formed in the triangular-profiled region when the brushes 608a, 608b, 608c are activated.

In this example, the housing 602 may be substantially rectangular in shape formed by support beams 601 arranged or sandwiched between the base plate 604a and a cover plate 603, wherein the cover plate 603 is positioned opposite to the base plate 604a. The housing 602 has an inwardly rounded cutoff at each of the four corners. Each cutoff corner may accommodate a vertical thruster 612a-612d which may be used to provide a force opposing a drift experienced by the underwater hull cleaning machine 600 when any one of the three brushes 608a, 608b, 608c is in the retracted position. Each vertical thruster 612a-612d may be operated individually or in any combination thereof to provide an aqedeuate thrusting force. The vertical thrusters 612a-612d are positioned towards the cover plate 603. An orifice 614 through the cover plate 603 may be provided to allow the conduit and a connecting sleeve (or tether) to pass through. In other words, the orifice 614 may refer to an access hole. The conduit and the connecting sleeve may be described in similar context as the conduit 280 and the connecting sleeve 282 of FIGS. 2B and 2C. On the exterior surface of the cover plate 603, skids/stands 618a, 618b may be provided to allow the cleaning machine 600 to be seated with clearance for the conduit and the connecting sleeve. Meanwhile, on the exterior surface of the base plate 604a, a loop point 622 may be provided to enable lifting of the machine 600 via a suspension cable (e.g., 284 in FIGS. 2B and 2C). The loop point 622 may be strategically positioned, e.g., substantially near the centre of gravity of the machine 600 so that a single-point lifting may be performed, while keeping the machine 600 relatively stable during the lifting process. The machine 600 may further include a termination junction box 607 that encloses electrical cables connections. This termination junction box 607 receives in power supply from a topside surface control room. Once power is received, the termination junction box 607 distributes the power and information to a control pod 616a. The control pod 616a in return sends signals to a valvepack 621 to control the cleaning machine components e.g. brushes; pan and tilt; brush up and down surface torque motion; a gyro sensor 616c and a thruster control unit 616b. The components may be supported by a hydraulic soft start block 609c, a hydraulic motor 609a, and a hydraulic compensator or mini compensator 630. A main reservoir 634 may be provided to store hydraulic fluid. The machine 600 may further include a filtering unit 609b. The components are arranged in various part of the housing 602. The machine 600 may further include a camera 606 installed towards the forward end 6002 and another camera (not shown) installed towards the aft 6004. Both cameras may be coupled to an interior surface of the base plate 604. The cameras may be rotated and/or tilted to provide essentially 360 degree views with zoom-in/zoom-out capabilities.

In this example, four vectored thrusters 610a-610d are provided toward or near the interior surface of the base plate 604a, and towards the rounded cutoff corners of the housing 602. The vectored thrusters 610a-610d may be attached to the interior surface of the base plate 604a. Each of the vectored thrusters 610a-610d may be positioned at an offset from the vertical thrusters 612a-612d. In other words, the vectored thrusters 610a-610d are not positioned along the respective thrust trajectory of the vertical thrusters 612a-612d.

The vertical thrusters 612a-612d enable the underwater hull cleaning machine 600 to continue moving along the external surface to be cleaned when there is insufficient retention force (caused by the vacuum), especially when the three brushes 608a, 608b, 608c are in the retracted position including pitch and roll functions. The vectored thrusters 610a-610d enable the underwater hull cleaning machine 600 to manoeuvre in left/right, or forward/reverse and lateral axis left/right directions. Each thruster power is about 100 Kg force per unit, with power rating of about 600 VDC with an invertor control from topside. Three wheels (front and rear) 620a, 620b, 620c may be coupled to the exterior surface of the base plate 604a and may be positioned spaced apart from one another, near the skirting 605. As described hereinabove, the wheels 620a, 620b, 620c may act as spacers so as to prevent the skirting 605 from collapsing and at the same time, the wheels 620a, 620b, 620c are rotatable, thereby allowing the cleaning machine 600 to manoeuvre more freely with the thrusters 610a-610d, 612a-612d.

When the cleaning machine 600 is in use, the amount of surface contact pressure may be increased or decreased through the hydraulic system. For example, the hydraulic system may be disposed within the housing (e.g., 102, 502, 602) of the cleaning machine 100, 200, 500, 600 in accordance with various embodiments. In other examples, the hydraulic system may be provided by a hull cleaning system (e.g., 120), parts of which may be disposed on a service vessel (e.g. 262) from which the cleaning machine (e.g., 100, 200, 500, 600) may be deployed.

The cleaning machine 100, 200, 500, 600 may be a remotely operated cleaning machine capable of being maneuvered along the hull. As described above, the cleaning machine 100, 200, 500, 600 enables cleaning to be performed only in areas that require to be cleaned. In other words, the cleaning machine 100, 200, 500, 600 may be capable of selective cleaning. More specifically, the brushes 108, 508a, 508b, 608a-608c may be raised away from the base region (e.g., 104, 504, 604) and not touch the hull surface (e.g., 260, 360, 560); thereby avoiding unnecessary surface contact with the hull. Alternatively, the brushes 108, 508a, 508b, 608a-608c may be lowered toward the base region (e.g., 104, 504, 604) and touch the hull surface (e.g., 260, 360, 560) at a predetermined level (e.g., with a predetermined control surface pressure) so that the cleaning may be performed without damaging the coating (e.g., anti-fouling coating) of the hull.

The controlled application of surface contact pressure along with the rotation of the brushes 108, 508a, 508b, 608a-608c may be collectively referred to as surface torque control.

It should be appreciated that unlike conventional cleaning machines, the underwater hull cleaning machine in accordance with various embodiments is capable of raising/lowering the brushes and/or has surface torque control; thereby providing selective cleaning.

There may be advantageous savings for operators of the ship from unnecessary agitating/re-activating/damaging/removal of good coating surface without any marine growth since the cleaning machine in accordance with various embodiments enables a controlled cleaning process where the amount of surface contact without removing/damaging the expensive anti-fouling coating may be controlled.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An underwater hull cleaning machine, comprising:
a housing including a base region adapted to be arranged facing at least part of an external surface to be cleaned;
a guiding mechanism comprising a thrusting mechanism;
at least one brush; and
a controller for controlling the at least one brush, a motor driver thereof, and the thrusting mechanism to apply a cleaning with a surface torque control,
wherein the guiding mechanism is coupled to the housing, and is configured to enable the underwater hull cleaning machine to be maneuvered along the external surface; and
the at least one brush is configured to move between an extended position and a retracted position to perform selective cleaning,
wherein in the extended position, the at least one brush is extended downwardly towards the base region to be in contact with the at least part of the external surface to be cleaned, and
wherein in the retracted position, the at least one brush is moved upwardly away from the base region to be free from contact with the external surface to refrain from cleaning a part of the external surface that is non-fouling,
wherein the surface torque control includes controlled application of surface contact pressure along with the extended position and a rotational speed of the at least one brush to provide different surface contact pressures of the at least one brush on the part of the external surface to be translated to different levels or degrees of cleaning,
wherein the guiding mechanism comprises a plurality of vectored thrusters spaced apart from one another and arranged in a manner to provide maneuverability of the underwater hull cleaning machine in different directions along a plane substantially parallel to the external surface to be cleaned, and at least four vertical thrusters configured to provide the thrusting mechanism arranged to provide a force opposing a drift experienced by the underwater hull cleaning machine, and enable the underwater hull cleaning machine to continue moving along the external surface with the at least one brush in the retracted position,
wherein the at least four vertical thrusters are configured to provide maneuverability of the underwater hull cleaning machine in an upward direction away from the external surface or in a downward direction towards the external surface, each of the at least four vertical thrusters being arranged extending outwardly along a periphery of the housing, and
wherein the at least four vertical thrusters and the at least one brush are configured to be individually driven.

2. The underwater hull cleaning machine of claim 1, wherein the guiding mechanism includes at least four vectored thrusters.

3. The underwater hull cleaning machine of claim 1, wherein the guiding mechanism comprises a gyro sensor configured to ascertain at least one of a direction that the underwater hull cleaning machine is heading, a position of the underwater hull cleaning machine relative to the external surface, a pitch of the underwater hull cleaning machine, or a roll of the underwater hull cleaning machine.

4. The underwater hull cleaning machine of claim 1, wherein the base region comprises a base plate, and wherein the underwater hull cleaning machine further comprises a wheel coupled to an exterior surface of the base plate.

5. The underwater hull cleaning machine of claim 4, further comprising a skirting coupled to the exterior surface of the base plate, wherein the skirting is arranged to surround the at least one brush.

6. The underwater hull cleaning machine of claim 1, further comprising a further brush configured to move between the extended position and the retracted position to perform selective cleaning,
wherein in the extended position, the further brush is extended downwardly towards the base region to be in contact with the at least part of the external surface to be cleaned, and wherein in the retracted position, the further brush is moved upwardly away from the base region to be free from contact with the external surface to refrain from cleaning a part of the external surface that is non-fouling.

7. The underwater hull cleaning machine of claim 6, wherein the at least one brush and the further brush are configured to move between the extended position and the retracted position synchronously with each other.

8. The underwater hull cleaning machine of claim 6, wherein the at least one brush and the further brush are configured to move between the extended position and the retracted position asynchronously with respect to each other.

9. The underwater hull cleaning machine of claim 1, further comprising a pressure gauge configured to detect an amount of force being applied to the external surface in response to a surface torque of the at least one brush.

10. The underwater hull cleaning machine of claim 1, further comprising a camera configured to capture a real-time image of the external surface or a part thereof.

11. The underwater hull cleaning machine of claim 1, further comprising a pump configured to transfer a suspension including marine growth removed from the external surface to an external filtering system.

12. A hull cleaning system, comprising:
an underwater hull cleaning machine of claim 1; and
a tank arranged to receive marine growth and/or contaminants removed by the underwater hull cleaning machine.

13. The hull cleaning system of claim 12, further comprising a filtering system configured to separate the marine growth and/or contaminants and seawater from a suspension transferred through a pump of the underwater hull cleaning machine.

14. A method for cleaning a hull of a vessel, the method comprising:
deploying an underwater hull cleaning machine of claim 1 to a surface of the hull;
capturing a real-time image of a part of the surface for determining whether the part of the surface is to be cleaned;
lowering at least one brush of the underwater hull cleaning machine to an extended position if it is determined for the part of the surface to be cleaned, wherein in the extended position, the at least one brush extends downwardly towards a base region of the underwater hull cleaning machine and contacts with the part of the surface to be cleaned;
raising the at least one brush to a retracted position if it is determined for the part of the surface not to be cleaned, wherein in the retracted position, the at least one brush moves upwardly away from the base region and is free from contact with the surface to refrain from cleaning a part of the external surface not required to be cleaned; and providing a thrusting mechanism arranged eccentrically with the at least one brush to provide a force opposing a drift experienced by the underwater hull cleaning machine, and enable the underwater hull cleaning machine to continue moving along the surface with the at least one brush in the retracted position, wherein the thrusting mechanism and the at least one brush are configured to be independently driven.

15. The method of claim 14, further comprising activating the at least one brush when in the extended position for cleaning and removing marine growth and/or contaminants from the part of the surface of the hull.

16. The method of claim 15, further comprising detecting an amount of force being applied to the external surface in response to a surface torque of the at least one activated brush; and adjusting at least one of the amount of brush contact with the external surface or the rotational speed of the at least one activated brush in response to the amount of detected force, thereby providing surface torque control.

17. The method of claim 14, further comprising maneuvering the underwater hull cleaning machine from the part of the surface of the hull to another part of the surface.

18. The method of claim 15, further comprising collecting the removed marine growth and/or contaminants for reclaiming.

* * * * *